(12) United States Patent
Keilwert et al.

(10) Patent No.: US 10,891,822 B2
(45) Date of Patent: Jan. 12, 2021

(54) GAMING MACHINES USING HOLOGRAPHIC IMAGING

(71) Applicant: IGT, Las Vegas, NV (US)

(72) Inventors: Stefan Keilwert, St. Josef (AT); Klaus Achmueller, Kalsdorf bei Graz (AT)

(73) Assignee: IGT, Las Vegas, NV (US)

( * ) Notice: Subject to any disclaimer, the term of this patent is extended or adjusted under 35 U.S.C. 154(b) by 322 days.

(21) Appl. No.: 15/711,434

(22) Filed: Sep. 21, 2017

(65) Prior Publication Data

US 2019/0088073 A1    Mar. 21, 2019

(51) Int. Cl.
*G07F 17/32*    (2006.01)
*A63F 13/53*    (2014.01)

(52) U.S. Cl.
CPC .......... *G07F 17/3209* (2013.01); *A63F 13/53* (2014.09); *G07F 17/3211* (2013.01); *G07F 17/3216* (2013.01); *A63F 2250/302* (2013.01)

(58) Field of Classification Search
CPC .. G07F 17/3209; G07F 17/3211; A63F 13/25; A63F 13/28; A63F 2300/203; A63F 2300/302; A63F 2350/30; A63F 2350/302; A63F 2350/305; A63F 2350/307

See application file for complete search history.

(56) References Cited

U.S. PATENT DOCUMENTS

| | | |
|---|---|---|
| 2005/0277467 A1 | 12/2005 | Karabin et al. |
| 2007/0218965 A1 | 9/2007 | Tilston et al. |
| 2008/0143895 A1* | 6/2008 | Peterka .............. G02B 27/0093 349/15 |
| 2009/0036208 A1* | 2/2009 | Pennington ......... G07F 17/3202 463/33 |
| 2010/0234094 A1* | 9/2010 | Gagner .................. G07F 17/32 463/20 |
| 2012/0270648 A1* | 4/2012 | Rasmussen et al. ........ G02F 1/13357 463/30 |
| 2014/0080593 A1* | 3/2014 | Rivera ................ G07F 17/3206 463/31 |
| 2015/0098143 A1* | 4/2015 | Anderson .............. G03B 21/10 359/839 |

\* cited by examiner

*Primary Examiner* — William H McCulloch, Jr.
*Assistant Examiner* — Ankit B Doshi
(74) *Attorney, Agent, or Firm* — Sage Patent Group

(57) ABSTRACT

A gaming device includes a gesture detection device that includes a gesture detector that is operable to detect a gesture of a player and a gesture interpreter that is configured to generate gesture data corresponding to the gesture, a housing that includes an interior that is defined by a plurality of opaque surfaces and a front surface that includes a portion that is a semi-transparent window that is configured to reflect, to the player, a reflected image of at least a portion of the player that is an object distance away from the semi-transparent window. The gaming device includes a display device that is arranged within the housing and that includes a display surface that faces the semi-transparent window, that is spaced apart from the semi-transparent window by about the object distance and that is configured to display a supplemental image that is visible through the semi-transparent window.

20 Claims, 12 Drawing Sheets

GAMING MACHINES USING HOLOGRAPHIC IMAGING

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to holographic imaging machines and methods, and in particular to machines and methods for use in connection with gaming.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three dimensional display screens. Additional gaming entertainment and user interface technologies are needed.

SUMMARY

The following detailed description discloses various non-limiting example embodiments of the invention. The invention can be embodied in many different forms and is not to be construed as limited to the embodiments set forth herein.

According to some embodiments, a gaming device is provided. The gaming device including a gesture detection device, a housing, and a display device. The gesture detection device can include a gesture detector that is operable to detect a gesture of a player and a gesture interpreter that is configured to generate gesture data corresponding to the gesture. The housing can include an interior and a front surface that includes a portion that is a semi-transparent window that is configured to reflect, to the player, a reflected image of at least a portion of the player that is an object distance away from the semi-transparent window. The display device can be arranged within the housing and can include a display surface that faces the semi-transparent window. The display surface can be spaced apart from the semi-transparent window by about the object distance and can be configured to display a supplemental image that is visible to the player through the semi-transparent window.

According to other embodiments, a method is provided. The method can include detecting a gesture corresponding to a portion of a player positioned on a first side of a semi-transparent window of a gaming device. The method can further include generating a reflected image of the portion of the player on the first side of the semi-transparent window. The method can further include generating gesture data corresponding to the detected gesture. The method can further include displaying a supplemental image on a display device that is on a second side of the semi-transparent window that is opposite the first side of the semi-transparent window, wherein a combined image that includes the reflected image and the supplemental image is visible to the player.

DETAILED DESCRIPTION

Embodiments of the inventive concepts provide systems and methods for holographic imaging in and/or in connection with an electronic gaming machine (EGM), or independently from an EGM. The holographic imaging may be provided to a player of an EGM or an observer (non-player) who is watching a player play an EGM. The holographic imaging may be associated with gesture detection and may be configured to provide a user interface for an EGM.

According to various embodiments, the holographic imaging can be rendered to the player using a semi-transparent window on an EGM. The EGM may include a housing that includes an interior that is defined by substantially opaque housing components and the semi-transparent window. The semi-transparent window may be substantially reflective relative to objects that are outside the interior of the housing. For example, when a player is in front of the semi-transparent window, the semi-transparent window may generate a reflected image of the player or a portion thereof. In this manner, in the absence of any light generated from within the housing interior, the semi-transparent window may act as a mirror.

A display may be positioned inside the interior of the housing and may include a display surface on which displayed images may be generated. The display may include a display surface that faces the semi-transparent window and that is at a distance from the semi-transparent window that is about the same as a distance between the player or portion thereof and the semi-transparent window. The display may generate a display image on the display surface that corresponds to the location of the reflected image of the player or portion thereof. The player may see a combined image that includes the reflected image of the portion of the player and the displayed image. In this manner, a holographic image effect may be generated.

Figure 1:
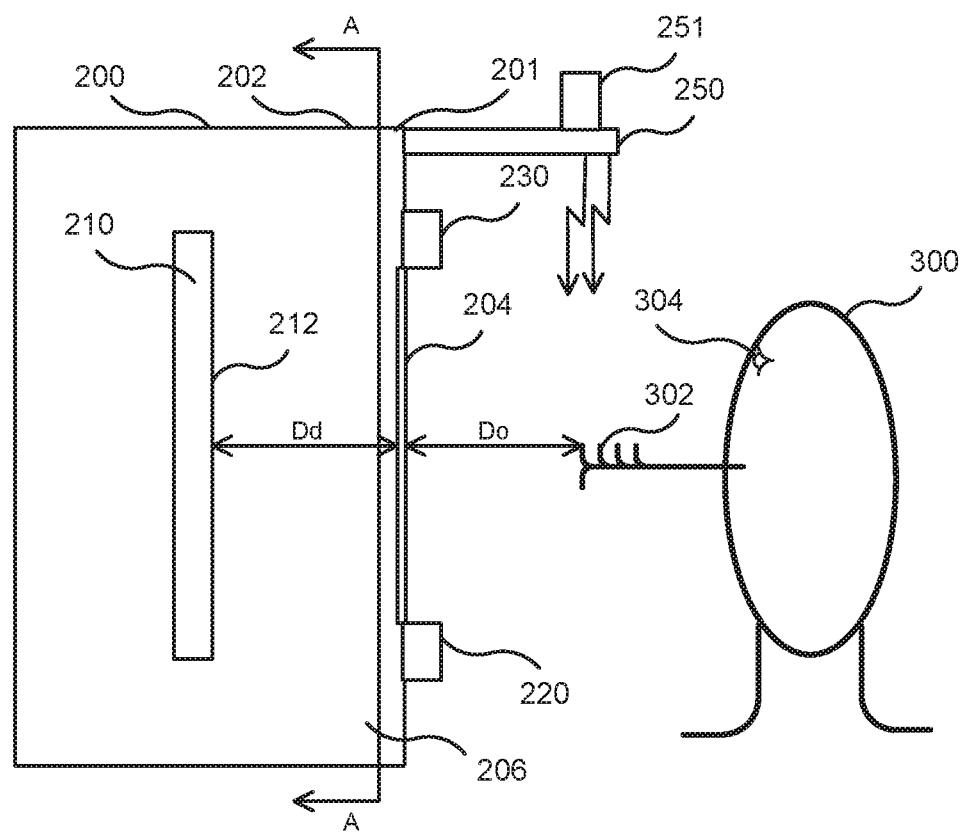
FIG. 1 is a schematic block diagram illustrating a side cut-away view of a gaming device according to some embodiments.

Reference is now made to FIG. 1, which is a schematic block diagram illustrating a side cut-away view of a gaming device according to some embodiments. The gaming device 200 includes a housing 201 that includes an interior 206 that is defined by multiple opaque surfaces 202 and a front surface that includes a portion that is a semi-transparent window 204. The opaque surfaces 202 may include metal, wood, fiber and/or plastic panels and/or fabric that may inhibit light from entering the interior 206, except through the semi-transparent window 204.

The semi-transparent window 204 may include a semi-transparent plate, sheet or other generally planar material that may inhibit light transmission in a range of about 20 percent to about 80 percent in the visible spectrum. In some embodiments, the semi-transparent window 204 may inhibit light transmission in a range of about 70 percent to about 80 percent in the visible spectrum. The semi-transparent window 204 may include a sheet of light transmissive material, such as a glass and/or transparent plastic sheet, that is coupled with one or more layers of film and/or sheet that may limit the transmission of light therethrough. For example, some embodiments provide that a microfoil film may be used to limit the transmission of light. The semi-transparent window 204 is reflective on the side that is adjacent the player 300 and may generate a reflected image of at least a portion 302 (e.g., hand) of the player 300 that is an object distance (Do) away from the semi-transparent window 204.

The gaming device 200 may include a display 210 that is arranged within the interior 206 of the housing 201. The display 210 may include a display surface 212 that faces the semi-transparent window 204. As illustrated, the player 300 is on one side of the semi-transparent window 204 and the display 210 is on the other side of the semitransparent window 204. The display 212 may be located at a display distance (Dd) from the semi-transparent window 204. Some embodiments provide that the display distance Dd is about the same as the object distance Do.

The gaming device 200 may include a gesture detection device 230 that includes a gesture detector that is operable to detect a gesture of a player. For example, the gesture device may detect that a player 300 has extended their hand (portion 302) towards the semi-transparent window and that the hand is at a distance that is distance Do therefrom. In such cases, the gesture detector 230 may include a gesture interpreter that is configured to generate gesture data corresponding to the gesture and/or the position of the hand (portion 302). Although illustrated as a single unit, a gesture device 230 may include multiple components that are spaced apart from one another and that function together to provide gesture detection and/or gesture interpretation operations.

The display surface 212 is configured to display a supplemental image that is visible to the player through the semi-transparent window. Since no light other than the supplemental image is transmitted through the semi-transparent window 204 from the interior 206, a combined image of the reflected image of the player's hand (portion 302) and the supplemental image from the display surface 212 in rendered to the player's eye 304. The combination of the two images provides a holographic image effect.

In some embodiments, the display device 210 includes a stereoscopic display that is configured to transmit first image data to one eye of the player and a second image data to the other eye of the player. The first and second image data may be different from one another to generate a three-dimensional image to the player 300.

Some embodiments provide the location of the supplemental image on the display surface 212 is based on a location of the hand (portion 302) of the player 300 relative to the semi-transparent window 204. For example, as the player's hand (portion 302) moves up, down, left and/or right, the location of the supplemental image may be changed to continue to generate the combined image. In some embodiments, the location of the supplemental image on the display surface may be based on a location of the eyes 304 of the player 300 relative to the hand (portion 302) of the player 300.

In addition to providing the holographic image effect, the gaming device 200 may generate gesture data as an input from the player to the gaming device 200. The gesture data may be generated by the gesture interpreter. Some embodiments provide that the supplemental image that is provided by the display 210 is configured to enhance the reflected image of the player's hand (portion 302) and to include one or more portions that correspond to inputs to the gaming device 200.

The gaming device 200 may include a haptic feedback device 220 that is configured to generate a haptic feedback to the player to enhance the player experience. Haptic feedback may be generated using a variety of technologies including ultrasonic waves directed to portions of the player, air currents delivered by fans and/or blowers and/or air currents delivered via air jets and/or orifices. The haptic feedback device 220 may generate the haptic feedback that corresponds to the combined image that includes the reflected image, the supplemental image that is generated by the display, and/or gesture data that is generated by the gesture interpreter.

The combination of the two images provides a holographic image effect that may be affected by a difference in the ambient light outside the housing 201 and the amount of light received within the housing 201. Some embodiments provide that the combination of the two images may be affected by the amount of light being reflected by the player's hand (portion 302) and the brightness of the supplemental image generated on the display surface 212. In this regard, if the ambient lighting on the outside of the housing 201 is low, then the reflected image may reflect less light and the holographic image effect based on the combined image may be less pronounced.

Some embodiments provide that the gaming device 200 may include an object illumination source 250 that is configured to provide illumination to the portion 302 of the player. The illumination provided may cause the portion 302 to be illuminated at a level that exceeds the ambient lighting. Some embodiments may include an ambient light sensor 251 that is operable to detect ambient light conditions and cause the object illumination source 250 to provide illumination to the portion 302. In this manner, the combined image may be provided with consistency regardless of the ambient lighting conditions.

Figure 2A:
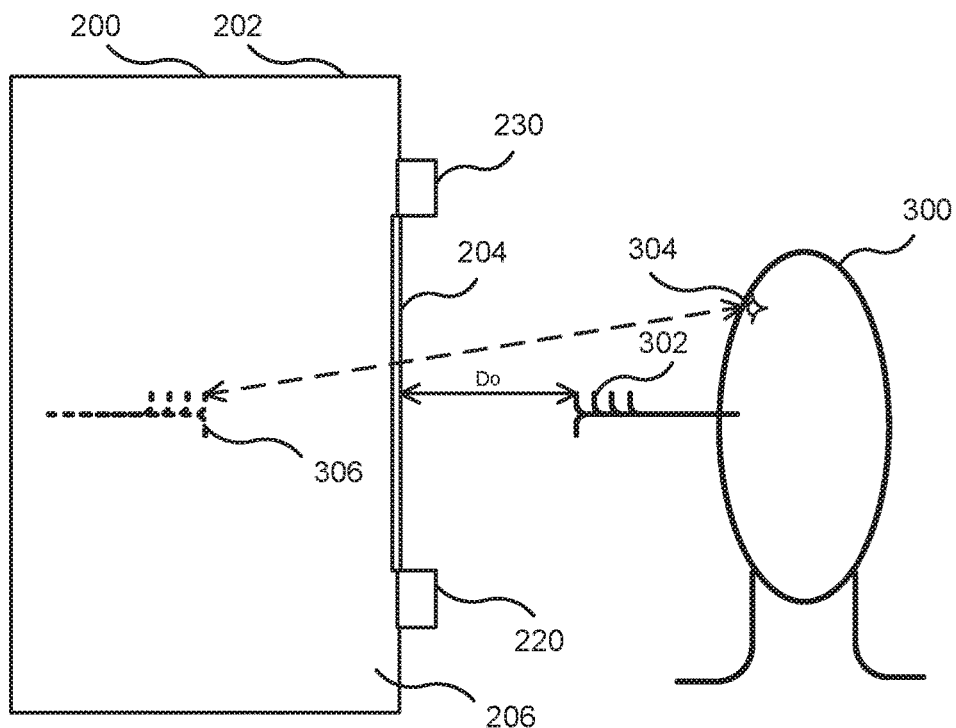
FIGS. 2A and 2B are partial schematic block diagrams illustrating side cut-away views of a gaming device according to various embodiments.
Figure 2B:
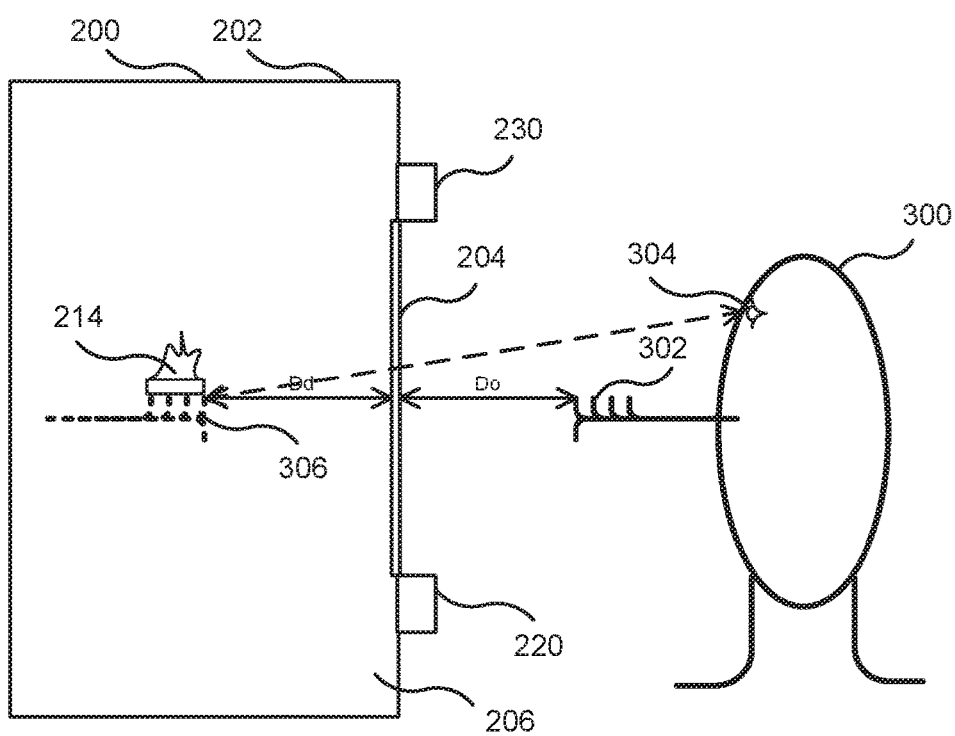

Reference is now made to FIGS. 2A and 2B, which are partial schematic block diagrams illustrating side cut-away views of a gaming device according to various embodiments. Several components illustrated in FIGS. 2A and 2B are discussed above regarding claim 1. As such, repeated discussion thereof will be omitted. Referring to FIG. 2A, in the absence of a supplemental image that is generated by a display (FIG. 1, 210), the semi-transparent window 204 may act as a mirror to the player 300. As such, the player 300 may see a reflected image 306 in the semi-transparent window 204. From the perspective of the player 300, the reflected image 306 may appear to be the same distance away from the semi-transparent window 204 as the player's hand (portion 302) is from the semi-transparent window 204.

Referring to FIG. 2B, the display 210 may generate a supplemental image 214 on the display surface 212. The supplemental image 214 may be displayed at a location on the display surface 212 that corresponds to the location of the player's hand (portion 302) and thus the location of the reflected image 306. For example, the supplemental image 214 may include an image of any type of object. Examples of displayed objects include objects that may have a corresponding temperature property such as a flame or ice. Other examples of displayed objects may include objects that have specific tactile properties, such as movement or vibration. In some embodiments, displayed objects may include objects that, when combined with the player's hand (portion 302) may alter and/or augment the appearance of the player's hand. Examples may include claws, weapons, tools, pointers, and/or magic wands, among others.

Figure 3A:
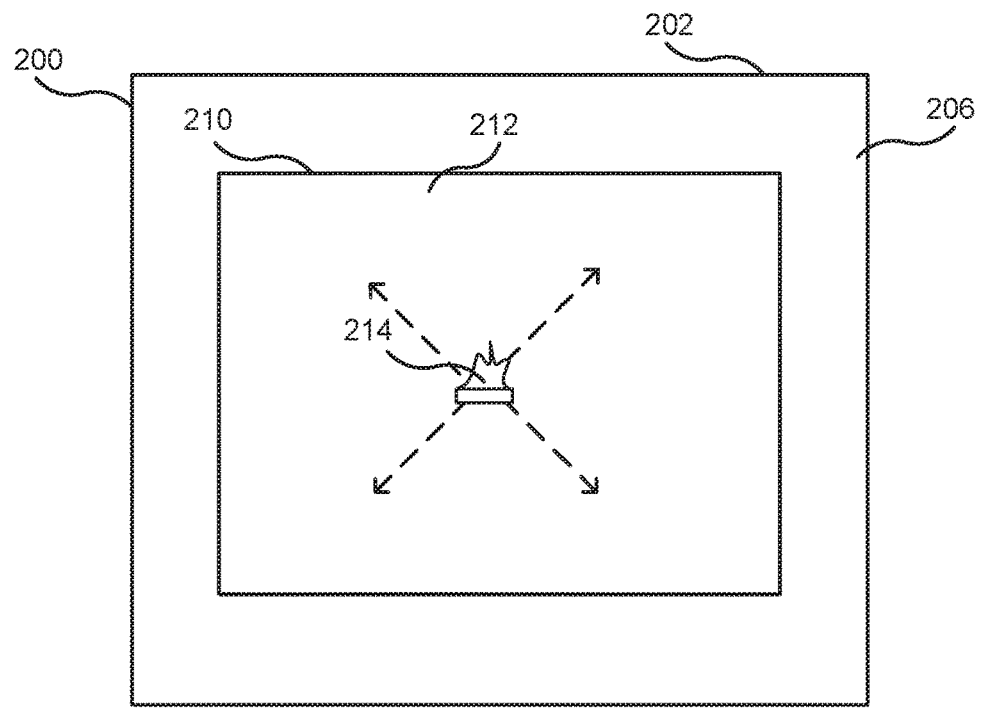
FIGS. 3A-3C are schematic block diagrams illustrating partial front views of a gaming device taken along line AA of FIG. 1 according to some embodiments.
Figure 3B:
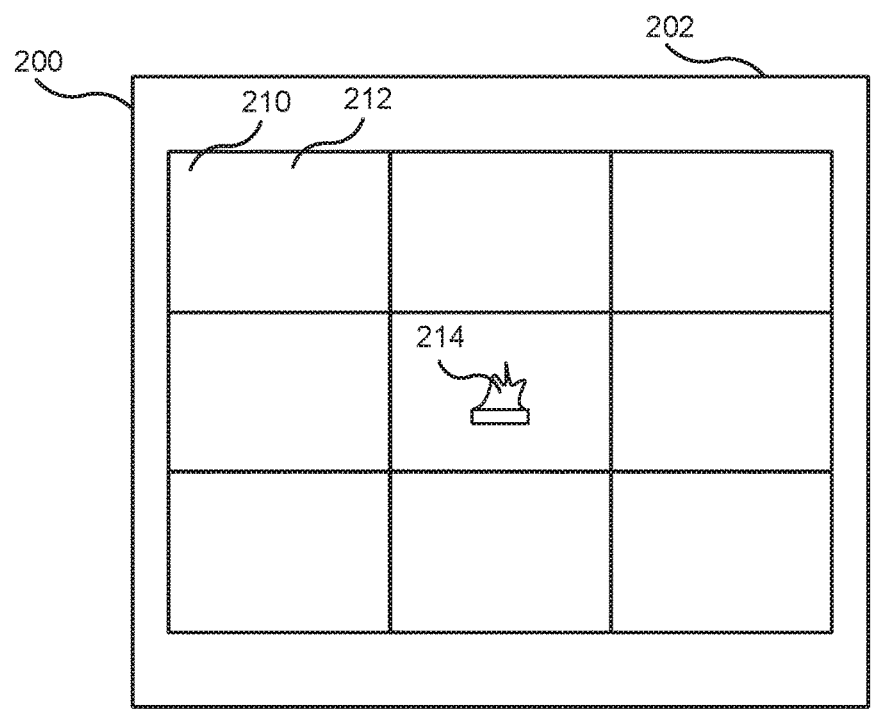
Figure 3C:
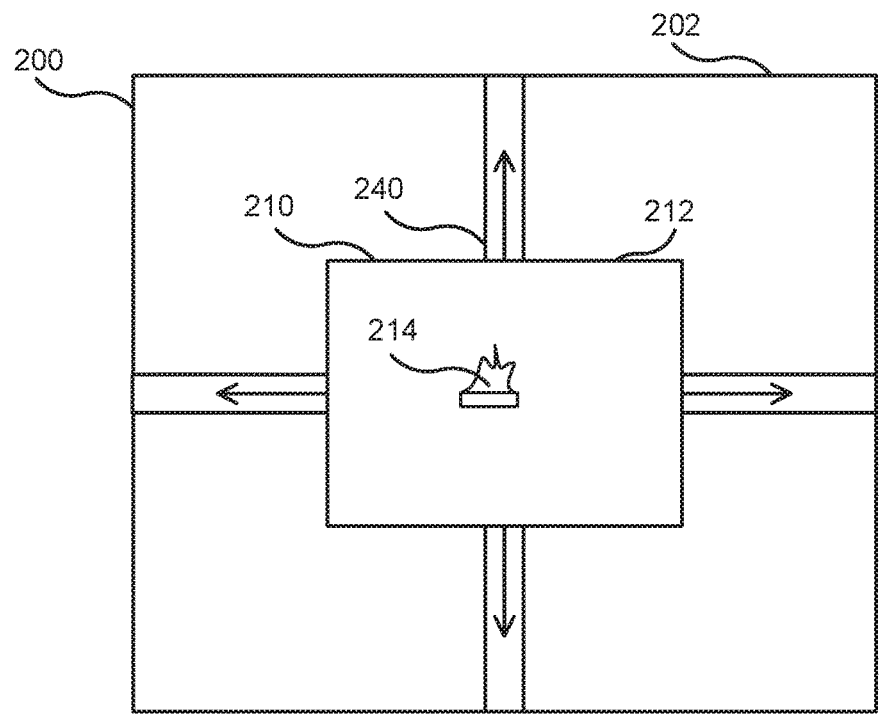

Reference is now made to FIGS. 3A-3C, which are schematic block diagrams illustrating partial front views of a gaming device taken along line AA of FIG. 1 according to some embodiments. Referring to FIG. 3A, a gaming device 200 includes a housing 202 that defines an interior 206. A display 210 that includes a display surface 212 is arranged within the interior 206 of the housing 202. The display surface 212 is operable to display a supplemental image 214 that corresponds to a position of a player and/or portion thereof. As illustrated by the dashed lines, the location of the supplemental image on the display surface 212 may be moved to correspond to movement of the player portion (FIG. 1, 302). Some embodiments provide that the display surface 212 may be sized to be larger than the semi-transparent window (FIG. 1, 204).

Some embodiments provide that the display surface 212 may be smaller than the semi-transparent window 204. In some embodiments, a display surface 212 that is smaller than the semi-transparent window 204 may result in a limited field of view for the holographic image effect. Referring to FIG. 3B, the gaming device 200 may include multiple displays 210 that may be positioned adjacent one another to create a larger display surface. In such embodiments, the location of the supplemental image 214 may be moved across the viewable area from one display surface 212 to another adjacent display surface 212. Although illustrated as a single supplemental image 214, multiple different supplemental images 214 may be displayed on one or more display surfaces 212. For example, different supplemental images may correspond to different inputs to the gaming device 200. Additionally, as the player's hand (portion 302) moves to cause the reflected image 306 to move, given ones of multiple different supplemental images 214 may change appearance, such as by getting brighter, generating a halo and/or other visual enhancements.

Some embodiments provide that, in addition to and/or alternatively, a single display 210 may be moved within the interior 206. For example, referring to FIG. 3C, some embodiments include a display positioning actuator 240 that may change the position of the display 210 within the housing 201. In some embodiments, the display positioning actuator 240 may be operable to move the display 210 in vertical ("y") and/or horizontal ("x") directions. In this manner, when the location of the supplemental image 214 is beyond the area defined by the display surface 212, the display 210 may be moved so that the supplemental image 214 may be displayed in the correct location. Some embodiments provide that a different display positioning actuator 240 is provided for each axis of motion. For example, a vertical display positioning actuator 240A may be operable to move the display 210 in the vertical ("y") direction and a horizontal display positioning actuator 240B may be operable to move the display 210 in the horizontal ("x") direction.

Figure 4:
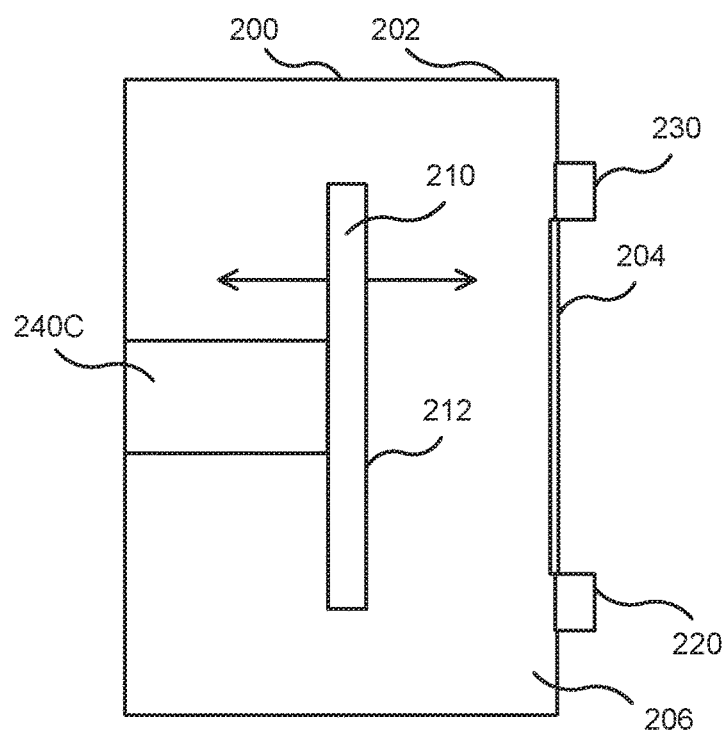
FIG. 4 is a schematic block diagram illustrating a partial side cut-away view of a gaming device according to some embodiments.

Although the display positioning actuator 240 is discussed above in terms of vertical ("y") and horizontal ("x") movement, brief reference is now made to FIG. 4, which is a schematic block diagram illustrating a partial side cut-away view of a gaming device according to some embodiments. As illustrated, a depth display positioning actuator 240C may be operable to move the display 210 in a depth ("z") direction. For example, the depth display positioning actuator 240C may be operable to move the display 210 toward and away from the semi-transparent window 204.

The display positioning actuator(s) 240A, 240B, 240C may include any combination of pneumatic, hydraulic and/or electrical actuator technologies. Although not illustrated, the display positioning actuator may also generate one or more position signals that provide data corresponding to the location of the display 210 within the housing 201.

Figure 5A:
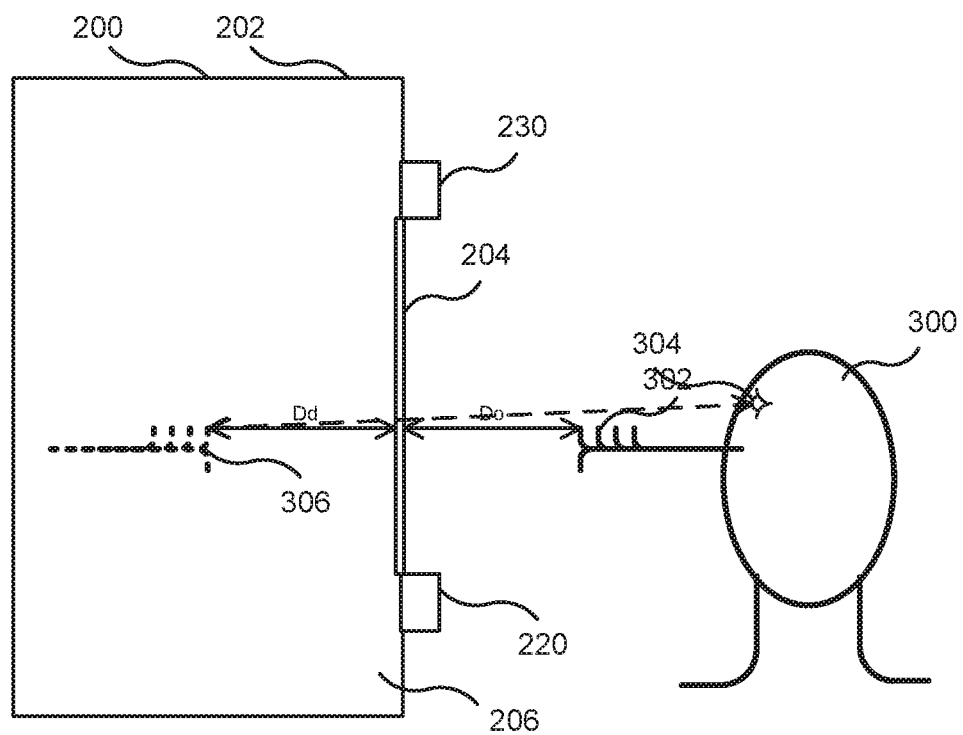
FIGS. 5A and 5B are schematic block diagrams illustrating partial side cut-away views of a gaming device according to various embodiments.
Figure 5B:
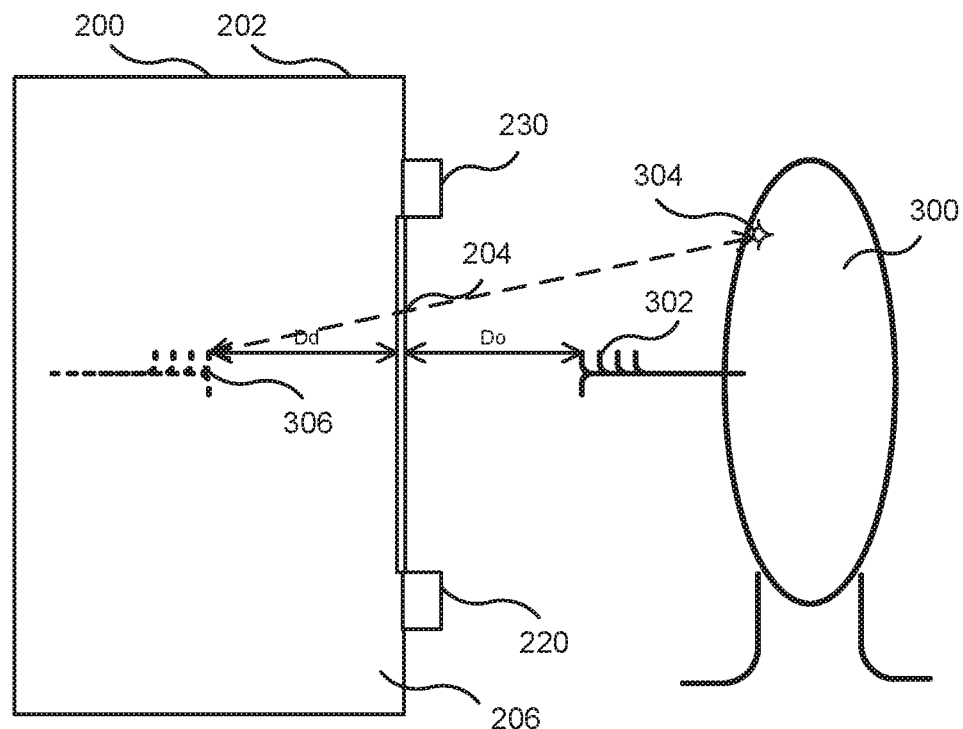

Reference is now made to FIGS. 5A and 5B, which are schematic block diagrams illustrating partial side cut-away views of a gaming device according to various embodiments. As illustrated, FIG. 5A includes a player 300 that has a low vertical eye 304 position relative to the reflected image 306 relative to the vertical eye 306 position of the player 300 illustrated in FIG. 5B. Some embodiments provide that the height and/or position of a player 300 may affect a correspondence between the gesture detection device 230 and the vertical position on the supplemental image (214, FIG. 2B) on the display surface (212, FIG. 1). Accordingly, some embodiments further provide that the height and/or position of the player's eyes 304 may be determined and/or estimated. In some embodiments, the determination and/or estimation may be provided by devices such as eye tracking cameras, etc. Some embodiments provide the eye height and/or position may be determined and/or estimated based on the position of the player 300. For example, a seated player may be assumed to have an eye height and/or position within a given range that corresponds to a seated player.

Based on the height of the player's eyes 304, the gesture detection device 230 may generate gesture detection data that includes a vertical gesture data offset that is based on the height of the player. In this manner, the supplemental image (214, FIG. 2B) may be generated to match a vertical offset in the three-dimensional space corresponding to the gesture detection device 230.

Figure 6A:
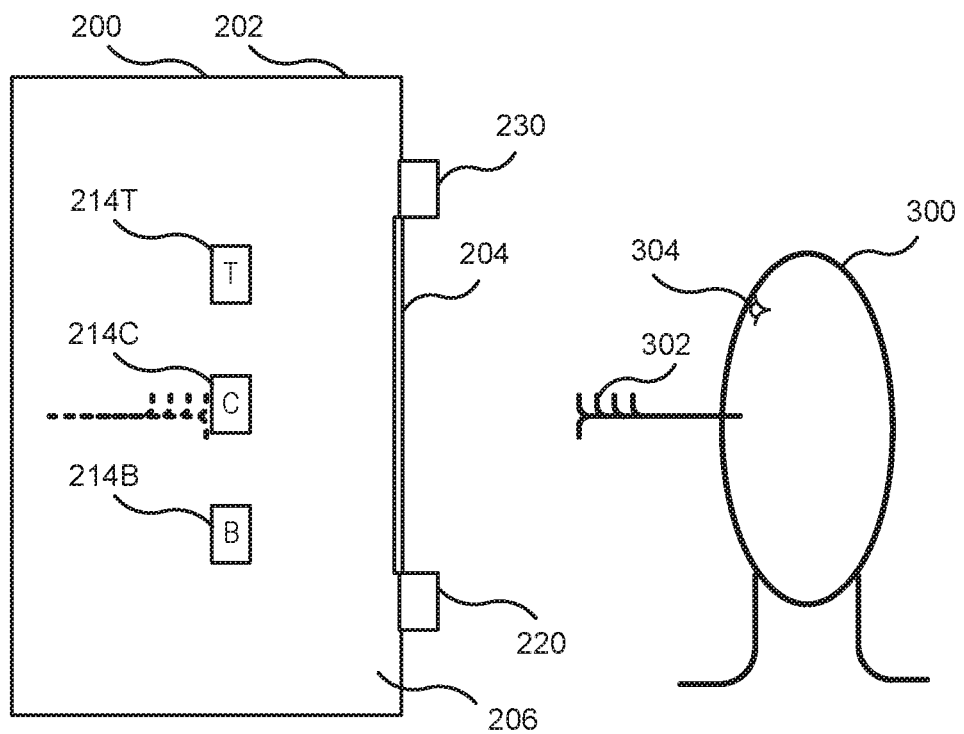
FIGS. 6A and 6B are schematic block diagrams illustrating side cut-away views of a gaming device according to various embodiments.
Figure 6B:
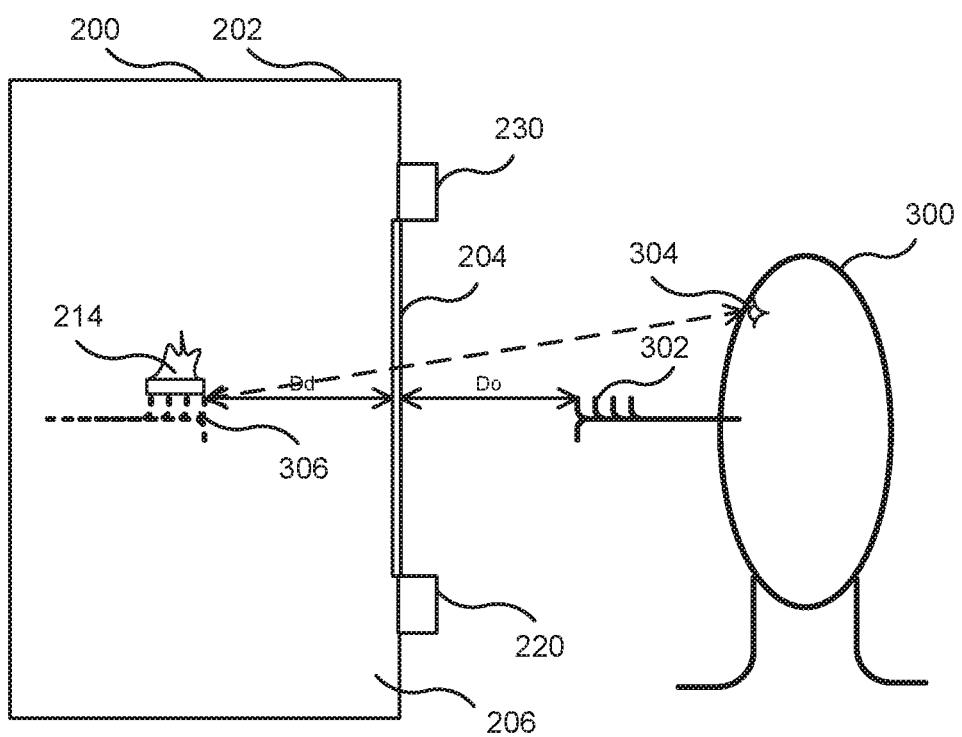

Some embodiments provide that the player position and/or height may be determined based on player specific calibration. For example, reference is now made to FIGS. 6A and 6B, are schematic block diagrams illustrating side cut-away views of a gaming device according to various embodiments. Referring to FIG. 6A, the player 300 may be presented with multiple supplemental images 214 that are spaced apart from one another on the display surface 212. For example, supplemental image 214T is a supplemental image that is positioned near the top of the display surface 212. Similarly, supplemental images 214C and 214B are supplemental images that are positioned, respectively, near the center and bottom of the display surface 212. Some embodiments provide that a player 300 may be encouraged to cause the reflected image 306 to engage each of the different supplemental images 214T, 214C, and 214B. The gesture detection device 230 may generate position data for the player portion 302 (e.g., hand) corresponding to the reflected image 306 as it engages each of the different supplemental images 214T, 214C, and 214B.

The locations of the supplemental images 214T, 214C, and 214B and the corresponding gesture detection data may be associated with one another and may be used to automatically calibrate the gesture detection data to subsequently provided supplemental images 214 in locations that correspond to the specific player attributes. Some embodiments provide that once calibrated, the supplemental images 214 and the gesture detection device 230 may be used to receive user inputs to the gaming device 200.

Although illustrated as three different supplemental images 214T, 21C, and 214B, gaming devices may use more or less than three images for the calibration. For example, in a two-dimensional context, a pair of supplemental images 214 may located in diagonally opposite corners from one another. In some embodiments, supplemental images 214 may be displayed in four locations corresponding to a virtual rectangle that may be used to generate gesture calibration data. Additionally, some embodiments provide that during game play, some supplemental images 214 may be displayed for updating and/or adjusting the calibration of the gesture detection device 230 and/or display locations.

Figure 7A:
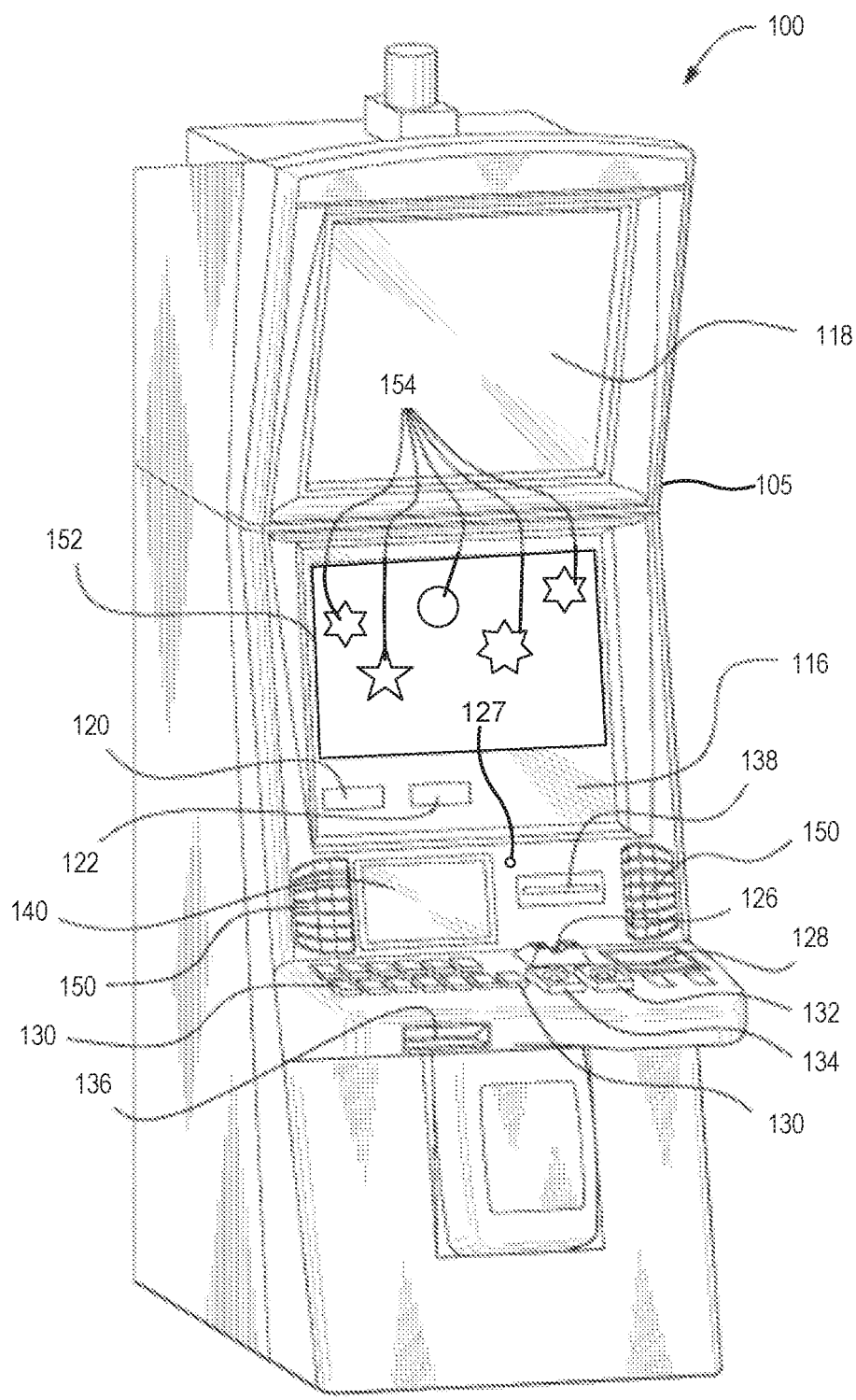
FIG. 7A is a perspective view of an electronic gaming device that can be configured according to some embodiments.
Figure 7B:
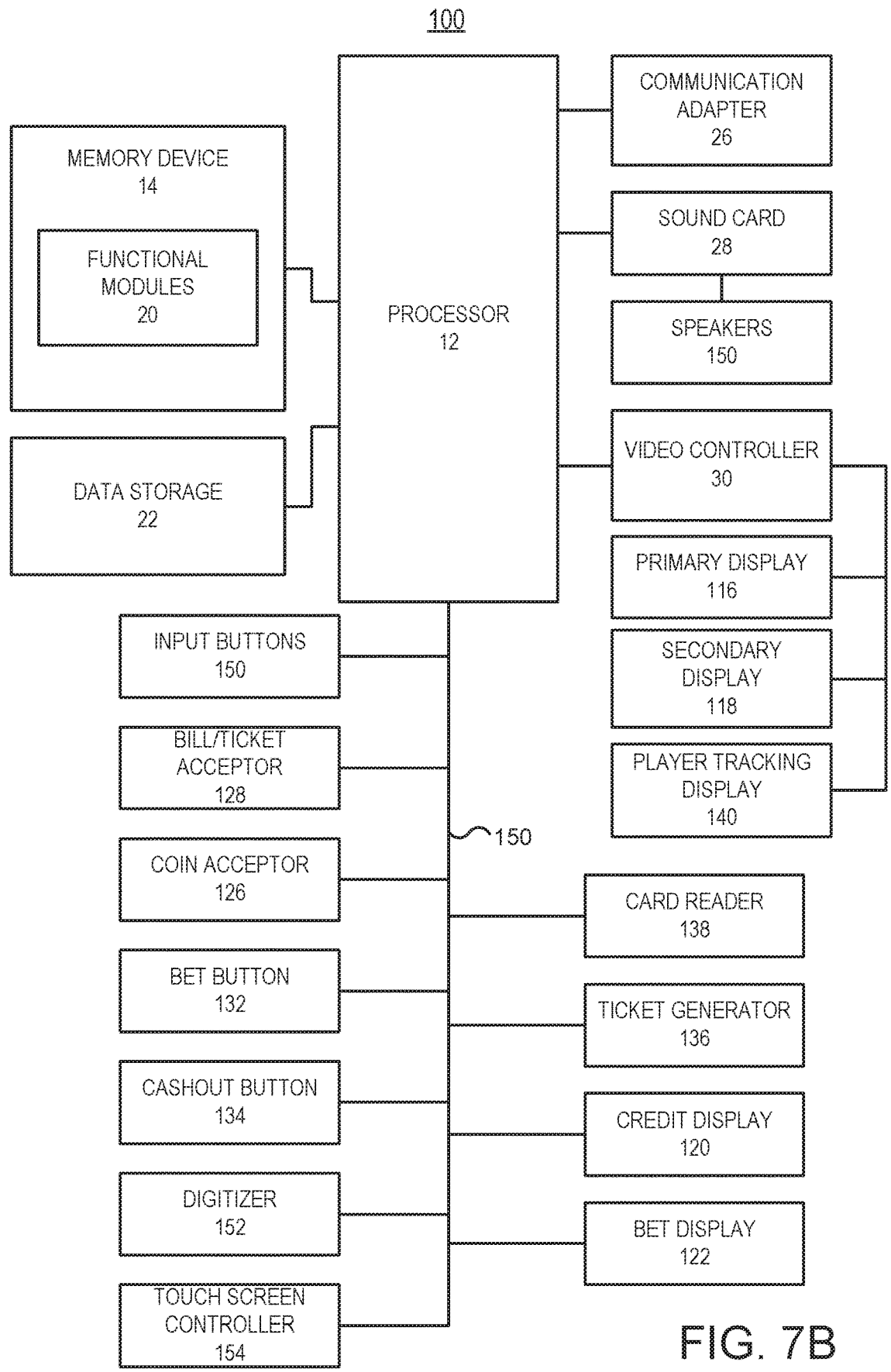
FIG. 7B is a schematic block diagram illustrating an electronic configuration for a gaming device according to some embodiments.
Figure 7C:
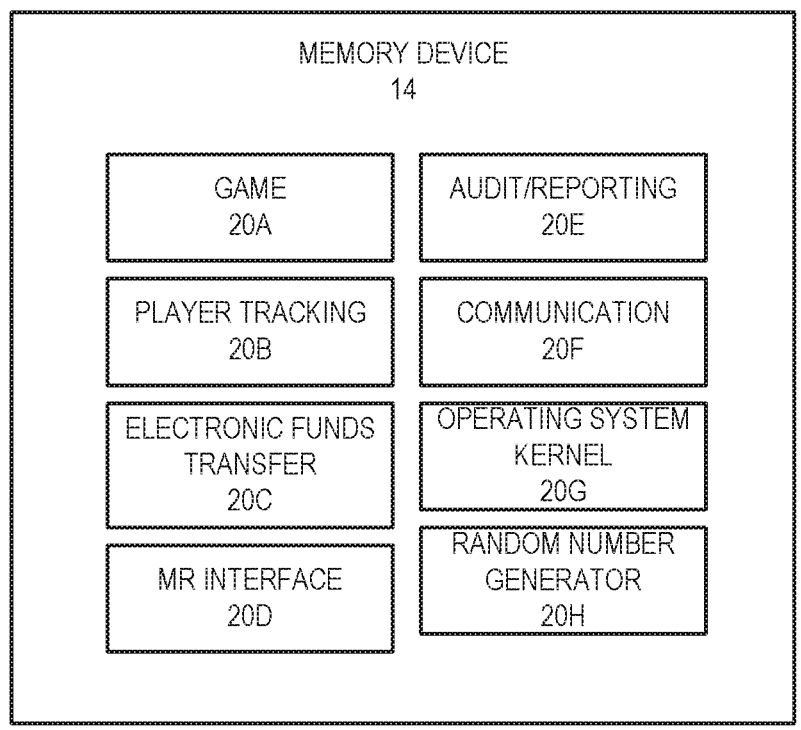
FIG. 7C is a block diagram that illustrates various functional modules of an electronic gaming device according to some embodiments.

An example of an electronic gaming machine (EGM) that can interact with mixed reality viewers according to various embodiments is illustrated in FIGS. 7A, 7B, and 7C in which FIG. 7A is a perspective view of an EGM 100 illustrating various physical features of the device, FIG. 7B is a functional block diagram that schematically illustrates an electronic relationship of various elements of the EGM 100, and FIG. 7C illustrates various functional modules that can be stored in a memory device of the EGM 100. The embodiments shown in FIGS. 7A to 7C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein. For example, some embodiments may be provided as a mirror wall that does not include the typical EGM cabinet configuration.

EGMs typically include a number of standard features, many of which are illustrated in FIGS. 7A and 7B. For example, referring to FIG. 7A, an EGM 100 may include a support structure, housing or cabinet 105 which provides support for a plurality of displays, inputs, outputs, controls and other features that enable a player to interact with the EGM 100. At least one of the displays may include a gaming device 200 as discussed herein.

The EGM 100 illustrated in FIG. 7A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 7A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display. Functions corresponding to one or more of the input buttons 130 may be performed using a gaming device 200 as disclosed herein.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 7A and 7B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 11B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

In some embodiments, one or more of the display screens may include embodiments of a gaming device 200. The player may interact with the EGM 100 by touching virtual buttons on one or more of the display devices 116, 118, 140 and/or by providing gestures corresponding to reflected images and/or supplemental images in a gaming device 200. Accordingly, any of the above described input devices, such as the input buttons 130, the game play initiation button 132 and/or the cashout button 134 may be provided as virtual buttons on one or more of the display devices 116, 118, 140 via a gaming device 200.

Referring briefly to FIG. 7B, operation of the primary display device 116, the secondary display device 118 and the player tracking display 140 may be controlled by a video controller 30 that receives video data from a processor 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor 12. In some embodiments, however, the credit display 120 and/or the bet display 122 may be driven by the video controller 30.

Referring again to FIG. 7A, the display devices 116, 118, 140 may include, without limitation: a cathode ray tube, a plasma display, a thin-film-transistor liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

While not illustrated in FIG. 7A, the EGM 100 may also include a note dispenser configured to dispense paper currency and/or a coin generator configured to dispense coins or tokens in a coin payout tray.

The EGM 100 may further include one or more speakers 150 controlled by one or more sound cards 28 (FIG. 7B). The EGM 100 illustrated in FIG. 7A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 7B is a block diagram that illustrates logical and functional relationships between various components of an EGM 100. As shown in FIG. 7B, the EGM 100 may include a processor 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 12 may be variously referred to as a "controller," "microcontroller," "microprocessor" or simply a "computer." The processor may further include one or more application-specific integrated circuits (ASICs).

Various components of the EGM 100 are illustrated in FIG. 7B as being connected to the processor 12. It will be appreciated that the components may be connected to the processor 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 7C.

The memory device 14 may store program code and instructions, executable by the processor 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 12. U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera in communication with the processor 12 (and possibly controlled by the processor 12) that is selectively positioned to acquire an image of a player actively using the EGM 100 and/or the surrounding area of the EGM 100. In some embodiments, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor 12 may incorporate that image into the primary and/or secondary game as a game image, symbol or indicia.

Various functional modules of that may be stored in a memory device 14 of an EGM 100 are illustrated in FIG. 7C. Referring to FIG. 7C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The wide area progressive (WAP) interface module 20D interacts with a remote WAP server to enable the EGM 100 to participate in a wide area progressive jackpot game as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In various embodiments, systems include one or more player tracking systems under control of the player tracking module 20B shown in FIG. 7C. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

As noted above, a player's progress or status can be saved in other ways besides using a player tracking system, such as by generating, when the player cashes out, a ticket including a printed code, such as a bar code or QR code, that identifies the player's session. When the player wants to continue the game, the player may insert the ticket including the printed code into the bill/ticket acceptor 128 of an EGM 100 (which may or may not be the same EGM 100 from which the ticket was issued). The EGM 100 reads the printed code and retrieves the player's status in response to the printed code.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 8:
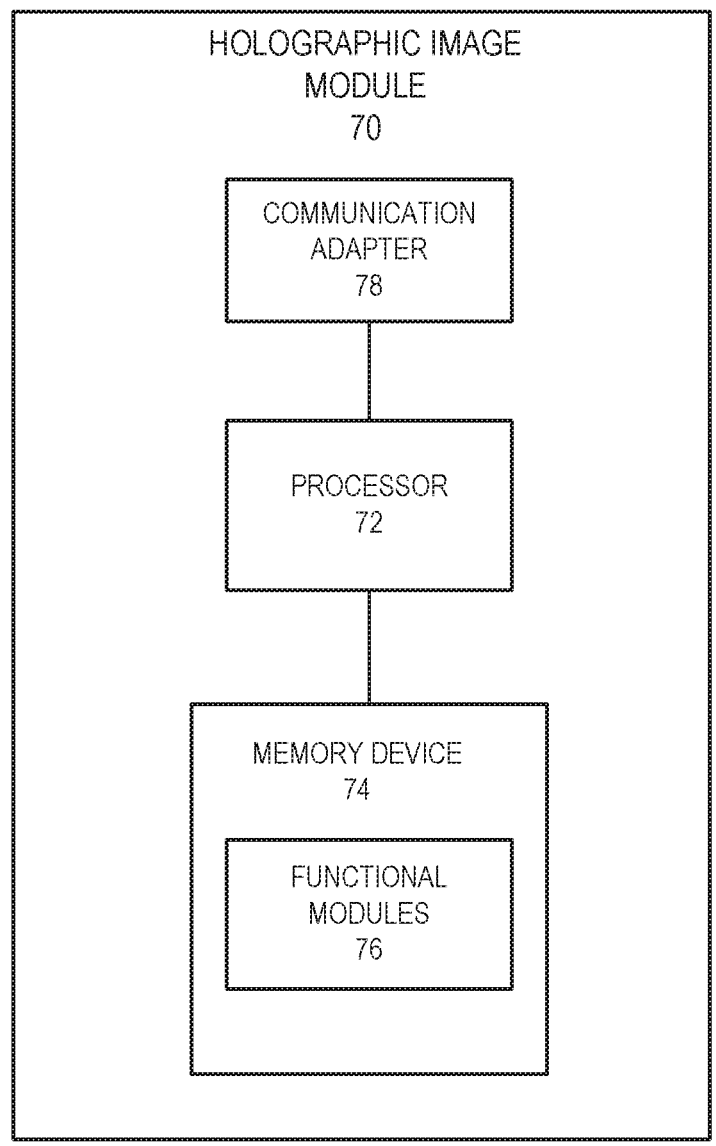
FIG. 8 is a schematic block diagram illustrating an electronic configuration for an holographic image module according to some embodiments.

Reference is now made to FIG. 8, which is a schematic block diagram illustrating an electronic configuration for an holographic image module according to some embodiments. As shown in FIG. 8, the holographic image module 70 may include a processor 72 that controls operations of the holographic image module 70. Although illustrated as a single processor, multiple special purpose and/or general purpose processors and/or processor cores may be provided in the holographic image module 70. For example, the EGM 100 may include one or more of a video processor, a signal processor, a sound processor and/or a communication controller that performs one or more control functions within the EGM 100. The processor 72 may be variously referred to as a "controller," "microcontroller," "microprocessor" or simply a "computer." The processor may further include one or more application-specific integrated circuits (ASICs).

Various components of the holographic image module 70 are illustrated in FIG. 8 as being connected to the processor 72. It will be appreciated that the components may be connected to the processor 72 through a system bus, a communication bus and controller, such as a USB controller and USB bus, a network interface, or any other suitable type of connection.

The holographic image module 70 further includes a memory device 74 that stores one or more functional modules 76 for performing the operations described above.

The memory device 74 may store program code and instructions, executable by the processor 72, to control the holographic image module 70. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The holographic image module 70 may include a communication adapter 78 that enables the holographic image module 70 to communicate with remote devices, such as EGMs 100 and/or a player tracking server 45 (FIG. 1) over a wired and/or wireless communication network, such as a local area network (LAN), wide area network (WAN), cellular communication network, or other data communication network.

The EGM 100 may include one or more internal or external communication ports that enable the processor 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 72.

Figure 9:
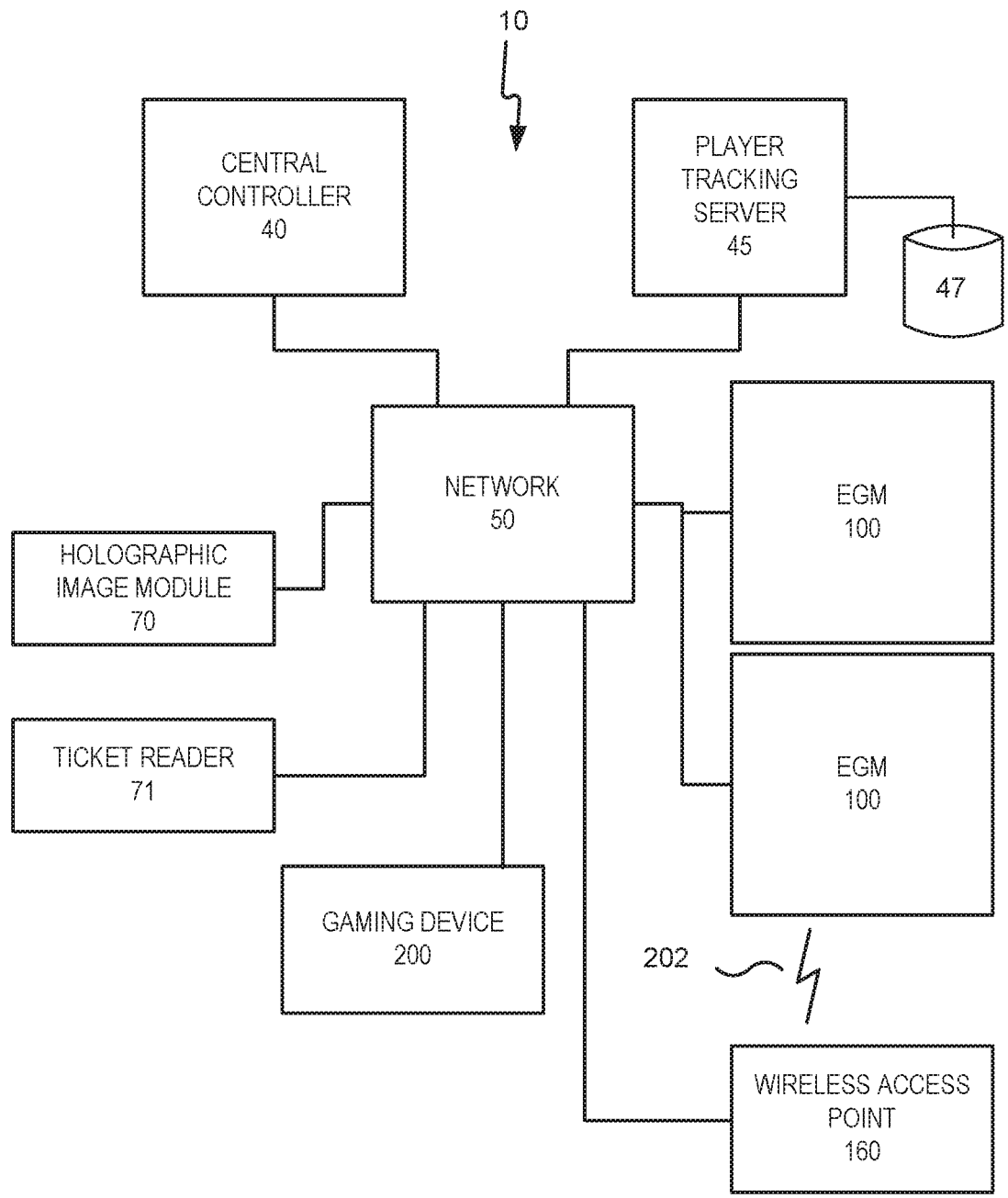
FIG. 9 is a schematic block diagram illustrating an electronic configuration for an augmented reality controller according to some embodiments.

Brief reference is now made to FIG. 9, which is a schematic block diagram illustrating an electronic configuration for an augmented reality controller according to some embodiments. Referring to FIG. 9, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 40 through a data network or remote communication link 50. The data communication network 50 may be a private data communication network that is operated, for example, by the gaming facility that operates the EGM 100. Communications over the data communication network 50 may be encrypted for security. The central controller 40 may be any suitable server or computing device which includes at least one processor and at least one memory or storage device. Each EGM 100 may include a processor that transmits and receives events, messages, commands or any other suitable data or signal between the EGM 100 and the central controller 40. The EGM processor is operable to execute such communicated events, messages or commands in conjunction with the operation of the EGM. Moreover, the processor of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processors. Moreover, in some embodiments, one or more of the functions of one or more EGM processors as disclosed herein may be performed by the central controller 40.

A wireless access point 160 provides wireless access to the data communication network 50. The wireless access point 160 may be connected to the data communication network 50 directly via the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, a gaming device 200 is provided. The gaming device 200 communicates with one or more elements of the system 10 to render two dimensional (2D) and/or three dimensional (3D) content to a player independent of and/or via one of the EGMs 100. That is, the gaming device 200 combines a reflected image with a supplemental image to create a combined image that renders a holographic effect. In this manner, the gaming device 200 "mixes" reflected images and supplemental images on a display into a single interactive viewing experience for the player. In some embodiments, the gaming device 200 may be further configured to enable the player to interact with virtual objects displayed to the player by the gaming device 200.

The gaming device 200 communicates with one or more elements of the system 10 to coordinate the rendering of holographic images to the player. For example, in some embodiments, the gaming device 200 may communicate directly with an EGM 100 over a wireless interface 202, which may be a WiFi link, a Bluetooth link, an NFC link, etc. In other embodiments, the gaming device 200 may communicate with the data communication network 50 (and devices connected thereto, including EGMs) over a wireless interface 204 with the wireless access point 160. The wireless interface 204 may include a WiFi link, a Bluetooth link, an NFC link, etc. In still further embodiments, the gaming device 200 may communicate simultaneously with both the EGM 100 over the wireless interface 202 and the wireless access point 160 over the wireless interface 204. In these embodiments, the wireless interface 202 and the wireless interface 204 may use different communication protocols and/or different communication resources, such as different frequencies, time slots, spreading codes, etc. For example, in some embodiments, the wireless interface 202 may be a Bluetooth link, while the wireless interface 204 may be a WiFi link.

The wireless interfaces 202, 204 allow the gaming device 200 to coordinate the generation and rendering of combined reflected and supplemental images to the player via the gaming device 200.

In some embodiments, the gaming system 10 includes a holographic image module 70. The holographic image module 70 may be a computing system that communicates through the data communication network 50 with the EGMs 100 and the gaming device 200 to coordinate the generation and rendering of combined reflected and supplemental images to one or more players using the gaming device 200. The holographic image module 70 may be implemented within or separately from the central controller 40, the gaming device 200 and/or an EGM 100.

In some embodiments, at least some processing of virtual images and/or objects that are rendered by the gaming devices 200 may be performed by the holographic image module 70, thereby offloading at least some processing requirements from the gaming devices 200.

Figure 10:
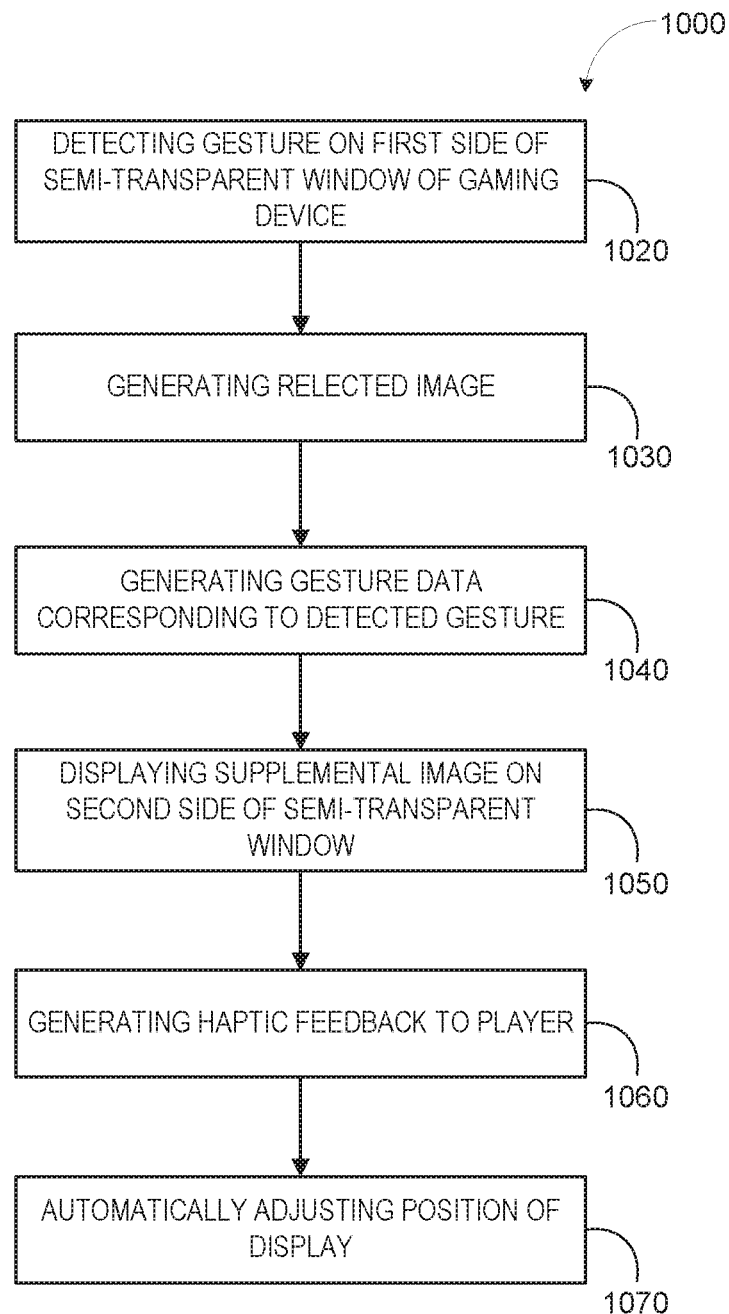
FIG. 10 is a flowchart illustrating operations of systems/methods according to some embodiments.

Reference is now made to FIG. 10, which is a flowchart illustrating operations of systems/methods 1000 according to some embodiments. Operations of systems and/or methods may include detecting a gesture corresponding to a portion of a player positioned on a first side of a semi-transparent window of a gaming device (block 1020). In some embodiments, the portion of the player that is used for generating the gesture that is detected is the player's hand/hands. However, some embodiments provide that other portions of the player may be used to provide a gesture including the player's arms, head, torso, hips, legs and/or feet. Some embodiments provide that gesture detection may be performed using optical and/or ultrasonic technologies, among others.

The semi-transparent window may include a first side that provides a substantially reflective surface. In this manner, when the portion of the player is on the first side of the semi-transparent surface, a reflected image of the portion of the player is generated thereon (block 1030). For example, responsive to a player extending her hand towards the semi-transparent window, a reflection of the extended hand may be generated.

A gesture detection device and/or gesture interpreter may generated gesture data that corresponds to the detected gesture (block 1040). The gesture data may include a location of the portion of the player relative to the semi-transparent window or other defined point of reference. Additionally, the gesture data may include data corresponding to different interactions/inputs to the gaming device. Some embodiments provide that gesture detection data may include data corresponding to different movements, orientations, positions and/or locations of the portion of the player. For example, a player's thumb and forefinger may be positioned to define a gap therebetween that may appear to be holding a supplemental image that is generated on a display.

In some embodiments, a supplemental image is displayed on a display device that is on a second side of the semi-transparent window (block 1050). A combined image that includes the reflected image and the supplemental image is visible to the player. In some embodiments, the supplemental image is located in a position to hover over the reflected image.

Some embodiments include generating a haptic feedback to the player (block 1060). In some embodiments, the haptic feedback corresponds to the combined image that includes the reflected image and the supplemental image. Some embodiments provide that the haptic feedback comprises ultrasonic and/or directed air feedback.

Operations may further include automatically adjusting a position of the display (block 1070). For example, the display may be moved in a sideways direction, a vertical direction, and/or a towards and away from the semi-transparent window. In some embodiments, the automatically adjusting is performed based on a position of the portion of the player relative to the semi-transparent window and/or a location of eyes of the player relative to the portion of the player.

Many different gaming applications can be achieved using holographic imaging systems/methods according to embodiments described herein, some of which will be described below. However, it will be appreciated that the description of possible applications included herein is not exhaustive, and systems/methods according to embodiments described herein may have many other applications besides those described below. Example applications may include:

Full Wall semi-transparent window: The semi-transparent window may be a wall of the indoor premises. In such implementations, the display may provide supplemental images that augment the player's appearance. For example, additional appendages (e.g., horns, claws, a third eye) may be added to the player's reflected image to augment the player's appearance. In some embodiments, the player's appearance may be augmented to the extent that the player appears to be an avatar in the combined image. Some embodiments provide that the supplemental image may include images of one or more attractive models that appear to be accompanying the player. Still other examples include a virtual character that may be displayed to be sitting on the player's head, shoulders, hands and/or feet. In such examples, the experience may be further enhanced with haptic feedback that generates sensations that correspond to the supplemental image. Some embodiments provide that a player status may be determined and that the augmentation corresponding to the supplemental image be generated corresponding of the player status. For example, if the player is a premium player, the supplemental image may be an aura that indicates prestige.

Prize-Catching: In embodiments in which the display is a stereoscopic display, the display may generate a supplemental image that is a fountain of coins, cash, dollar signs, stars or other indications of value or desirability. The player can attempt to catch the indications of value in the supplemental image. Each time the player catches one of the indications of value, a win meter may be incremented. The prize-catching session may be a timed session and/or may include a prize timer that counts down until the player has caught all of the indications of value. In such embodiments, the countdown timer may reduce an awarded value as time elapses.

Hint Bubble: Some embodiments provide that the supplemental image may include a thought bubble that appears above the player's image. The thought bubble may include strategy information, hints regarding game play and/or options therefor.

Object Manipulation: In some embodiments, the player may appear to be holding and/or manipulating a small object such as a cube or ball.

Themed Avatar: Every registered player may have his or her own avatar, which may be near or above each player. The player's initial avatar may appear small and unimpressive. However, with increasing levels (indicated by the player's number of games/rounds/credits played) the avatar may become larger, more ornate, obtain accessories, etc., that indicate the player's experience. Seeing other players' avatars may motivate a player to gain a higher leveled avatar as well.

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A gaming device comprising:
a gesture detection device that includes a gesture detector that is operable to detect a gesture of a player and a gesture interpreter that is configured to generate gesture data corresponding to the gesture;
a housing that includes an interior and a front surface that includes a portion that is a semi-transparent window that is configured to reflect, to the player, a reflected image of at least a portion of the player that is an object distance away from the semi-transparent window;
an object illumination source that is configured to provide illumination to the portion of the player; and
a display device that is arranged within the housing and that includes a display surface that faces the semi-transparent window, that is spaced apart from the semi-transparent window by about the object distance and that is configured to display a supplemental image that is visible to the player through the semi-transparent window.

2. The gaming device according to claim 1, wherein the display surface is parallel to the semi-transparent window.

3. The gaming device according to claim 1, wherein a combined image that includes the reflected image that is the portion of the player that is reflected from the semi-transparent window and the supplemental image that is generated by the display device and that is transmitted through the semi-transparent window is visible to the player.

4. The gaming device according to claim 1, wherein a location of the supplemental image on the display surface is based on a location of the portion of the player relative to the semi-transparent window.

5. The gaming device according to claim 1, wherein a location of the supplemental image on the display surface is based on a location of eyes of the player relative to the portion of the player.

6. The gaming device according to claim 1, wherein the gesture interpreter is configured to generate the gesture data as an input from the player to the gaming device.

7. The gaming device according to claim 6, wherein the gesture interpreter is configured to generate the gesture data as the input from the player to the gaming device based on a location of the supplemental image on the display surface.

8. The gaming device according to claim 1, further comprising a haptic feedback device that is configured to generate a haptic feedback to the player corresponding to a combined image that includes the reflected image that is the portion of the player that is reflected from the semi-transparent window and the supplemental image that is generated by the display device and that is transmitted through the semi-transparent window and is visible to the player.

9. The gaming device according to claim 1, wherein the display device comprises a stereoscopic display that is configured to transmit a first image to a first eye of the player and a second image to a second eye of the player, wherein the first and second images are different from one another, and wherein the first and second images generate a three-dimensional image to the player.

10. The gaming device according to claim 1, further comprising a display positioning actuator that is configured to change a position of the display surface within the housing.

11. The gaming device according to claim 10, wherein the display positioning actuator is configured to move the display surface in a sideways direction, a vertical direction, and/or a towards and away from the semi-transparent window.

12. The gaming device according to claim 1, wherein the display device comprises a plurality of display devices that are arranged within the housing and that each include one display surface that faces the semi-transparent window and that are configured to display the supplemental image that is visible to the player through the semi-transparent window.

13. The gaming device according to claim 1, further comprising an ambient light sensor that is configured to detect an ambient light condition and, responsive to detecting a low light condition, cause the object illumination source to operate to provide illumination to the portion of the player.

14. The gaming device according to claim 1,
wherein a combined image that includes the reflected image that is the portion of the player that is reflected from the semi-transparent window and the supplemental image that is generated by the display device and that is transmitted through the semi-transparent window is visible to the player, and
wherein the combined image comprises a user interface for receiving user inputs from the player to an electronic gaming machine.

15. The gaming device according to claim 1, wherein, responsive to the display device not displaying an image, the semi-transparent window reflects the reflected image without the supplemental image.

16. The gaming device according to claim 1, wherein the semi-transparent window comprises a light transmission property of 70 percent to 80 percent.

17. A method comprising:
detecting a gesture corresponding to a portion of a player positioned on a first side of a semi-transparent window of a gaming device;
responsive to detecting the gesture corresponding to the portion of the player, illuminating the portion of the player;
generating a reflected image of the portion of the player on the first side of the semi-transparent window;
generating gesture data corresponding to the detected gesture; and
displaying a supplemental image on a display device that is on a second side of the semi-transparent window that is opposite the first side of the semi-transparent window, wherein a combined image that includes the reflected image and the supplemental image is visible to the player.

18. The method according to claim 17, further comprising generating a haptic feedback to the player corresponding to the combined image that includes the reflected image that is the portion of the player that is reflected from the semi-transparent window and the supplemental image that is generated by the display device and that is transmitted through the semi-transparent window, wherein the haptic feedback comprises sonic and/or directed air feedback.

19. The method according to claim 17, further comprising automatically adjusting a position of the display device in a sideways direction, a vertical direction, and/or a towards and away from the semi-transparent window, wherein the automatically adjusting is performed based on a position of the portion of the player relative to the semi-transparent window and/or a location of eyes of the player relative to the portion of the player.

20. The method according to claim 17, further comprising activating a display positioning actuator that is configured to change a position of the display device.

\* \* \* \* \*